(12) United States Patent
Schulz et al.

(10) Patent No.: US 12,104,218 B2
(45) Date of Patent: Oct. 1, 2024

(54) SHEET METAL COMPONENT AND METHOD FOR PRODUCING SAME

(71) Applicant: ThyssenKrupp Steel Europe AG, Duisburg (DE)

(72) Inventors: Jennifer Schulz, Unna (DE); Maria Köyer, Dortmund (DE); Manuela Ruthenberg, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 18/027,201

(22) PCT Filed: Sep. 17, 2021

(86) PCT No.: PCT/EP2021/075671
§ 371 (c)(1),
(2) Date: Mar. 20, 2023

(87) PCT Pub. No.: WO2022/058531
PCT Pub. Date: Mar. 24, 2022

(65) Prior Publication Data
US 2023/0366057 A1   Nov. 16, 2023

(30) Foreign Application Priority Data

Sep. 21, 2020   (DE) ...................... 10 2020 124 488.6

(51) Int. Cl.
| | |
|---|---|
| *C21D 9/46* | (2006.01) |
| *C21D 1/18* | (2006.01) |
| *C21D 6/00* | (2006.01) |
| *C21D 8/02* | (2006.01) |
| *C22C 21/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/22* | (2006.01) |
| *C22C 38/28* | (2006.01) |
| *C22C 38/32* | (2006.01) |
| *C23C 2/12* | (2006.01) |
| *C23C 2/26* | (2006.01) |
| *C23C 2/28* | (2006.01) |
| *C23C 2/40* | (2006.01) |

(52) U.S. Cl.
CPC ............... *C21D 9/46* (2013.01); *C21D 1/18* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 21/02* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/28* (2013.01); *C22C 38/32* (2013.01); *C23C 2/12* (2013.01); *C23C 2/26* (2013.01); *C23C 2/28* (2013.01); *C23C 2/40* (2013.01)

(58) Field of Classification Search
None
See application file for complete search history.

(56) References Cited

U.S. PATENT DOCUMENTS

| | | | |
|---|---|---|---|
| 10,669,603 B2 | 6/2020 | Banik et al. | |
| 11,401,574 B2 | 8/2022 | Ruthenberg et al. | |
| 2012/0298183 A1 | 11/2012 | Buresch et al. | |
| 2020/0385849 A1* | 12/2020 | Bordignon | ............... C25D 3/30 |

FOREIGN PATENT DOCUMENTS

| | | |
|---|---|---|
| AU | 2004209947 B2 | 8/2004 |
| EP | 2993248 A1 | 3/2016 |
| WO | 2008053273 A1 | 5/2008 |
| WO | 2011098255 A2 | 8/2011 |
| WO | 2017144407 A1 | 8/2017 |
| WO | 2019002026 A1 | 1/2019 |
| WO | 2019192703 A1 | 10/2019 |

* cited by examiner

*Primary Examiner* — Daniel J. Schleis
(74) *Attorney, Agent, or Firm* — The Webb Law Firm

(57) ABSTRACT

A sheet metal component made of a hot-formed flat steel product including a steel substrate consisting of, in mass. %, C: 0.1-0.4%, Mn: 0.5-3.0%, Si: 0.05-0.5%, Cr: 0.005-1.0%, B: 0.00050.01% and optionally one or more of V, Ti, Nb, Al, Ni, Cu, Mo, and W, where the contents of the respective optionally present alloy element are V: 0.001-0.2%, Ti: 0.01-0.1%, Nb: 0.001-0.1%, Al: 0.01-0.2%, Ni: 0.01-0.4%, Cu: 0.01-0.8%, Mn: 0.002-1.0%, W: 0.001-1.0%, and the remainder iron and unavoidable impurities, wherein the unavoidable impurities include contents of less than 0.1% P, less than 0.05% S, and less than 0.01% N, and an Al corrosion protection layer applied to the steel substrate, wherein the component is optionally hardened. An adhesive section having an SDR value of 3-30%, determined according to ISO 25178, is provided on the free outer face of the corrosion protection coating for adhering the sheet metal component to another component.

12 Claims, No Drawings

SHEET METAL COMPONENT AND METHOD FOR PRODUCING SAME

CROSS-REFERENCE TO RELATED APPLICATIONS

This application is the United States National Phase of International Application No. PCT/EP2021/075671 filed Sep. 17, 2021, and claims priority to German Patent Application No. 10 2020 124 488.6 filed Sep. 21, 2020, the disclosures of which are hereby incorporated by reference in their entireties.

BACKGROUND OF THE INVENTION

Field of the Invention

The invention relates to a sheet metal component formed by a hot-formed flat steel product. The flat steel product is made of a steel substrate which, in mass. %, consists of C: 0.1-0.4%, Mn: 0.5-3.0%, Si: 0.05-0.5% Cr: 0.005-1.0%, B: 0.0005-0.01%, and respectively optionally one or more of the alloy elements included in the group V, Ti, Nb, Al, Ni, Cu, Mo, W, with the proviso that the contents of the respective optionally present alloy element are to be measured as follows: V: 0.001-0.2%, Ti: 0.001-0.1%, Nb: 0.001-0.1%, Al: 0.01-0.2%, Ni: 0.01-0.4%, Cu: 0.01-0.8% Mo: 0.002-1.0%, W: 0.001-1.0%, and a remainder of iron and unavoidable impurities, wherein the unavoidable impurities include contents of less than 0.1% P, less than 0.05% S, and less than 0.01% N. Thereby a corrosion protection layer based on aluminum is applied onto the steel substrate.

The invention also relates to a method for producing such a component.

Description of Related Art

A component of the aforementioned type and a method for its production are known, for example from WO 2008/053273 A1.

"Flat steel products" are understood here to be rolled products the length and width of which are each substantially greater than their thickness. These include in particular steel strips, steel sheets, and blanks obtained therefrom.

In the present text, unless explicitly noted otherwise, it is noted that information about the contents of alloy components is always in relation to mass (specification in mass. %).

For components produced by hot forming a flat steel product coated with an aluminum-based corrosion protection, a particular challenge results if such components are to be adhered to a further component, for example within the scope of a modern car body production. This applies irrespective of the material of which the second component to be adhered consists.

Adhesives which have previously been used as standard for hot-formed surfaces are designed either for an uncoated material or for zinc surfaces. Aluminum surfaces and surfaces made of aluminum alloys have the disadvantage, relative to surfaces of Zn-based corrosion protection layers, that the aluminum oxide layer forming on the free surface of the Al corrosion protection layer prevents a good adhesion, since the chemical bonding of the zinc-conditioned adhesives to aluminum oxides is markedly poorer than to zinc surfaces.

SUMMARY OF THE INVENTION

Against this background, the object results to provide a component which is provided on at least one surface with an aluminum or aluminum alloy coating, and thereby offers optimal preconditions for good adhesive bonding on its coating.

A method for producing such a component is likewise to be specified.

The invention has achieved this object via a component that has at least the features specified herein.

With regard to the method, the achievement of the object specified in the preceding exists in that the work steps specified herein are completed in the production of components according to the invention. It is thereby inherently understood that, in applying the method according to the invention, a person skilled in the art independently supplements the work steps which he knows are performed as standard in methods of this type in the prior art.

Advantageous embodiments of the invention are specified and explained in detail below, as is the general inventive concept.

DESCRIPTION OF THE INVENTION

A component according to the invention is thus formed, in accordance with the prior art explained above, by a hot-formed flat steel product comprising:

a steel substrate which, in mass. %, consists of
C: 0.1-0.4%,
Mn: 0.5-3.0%,
Si: 0.05-0.5%,
Cr: 0.005-1.0%,
B: 0.0005-0.01%,
and in each case optionally one or more of the alloy elements included in the group V, Ti, Nb, Al, Ni, Cu, Mo, W, with the proviso that the contents of the respective optionally present alloy element are to be measured as follows:
V: 0.001-0.2%,
Ti: 0.001-0.1%,
Nb: 0.001-0.1%,
Al: 0.01-0.2%,
Ni: 0.01-0.4%,
Cu: 0.01-0.8%,
Mo: 0.002-1.0%,
W: 0.001-1.0%,
and a remainder of iron and unavoidable impurities, wherein the unavoidable impurities include contents of less than 0.1% P, less than 0.05% S, and less than 0.01% N,
and
a corrosion protection layer based on aluminum, applied to the steel substrate.

Supplementary to its hot forming, a component according to the invention can be present in a hardened state. For this purpose, the component may have been hardened in a manner known per se at the same time as the hot forming (what is known as "press hardening"), or in a heat treatment process downstream of the hot forming process (see the aforementioned WO 2008/053273 A1).

According to the invention, an adhesive section is provided on the free outer face of the corrosion protection coating of the component, which adhesive section is intended for applying an adhesive for adhering the sheet metal component to a further component, wherein the surface of the corrosion protection coating has an SDR value of 3-30%, determined according to ISO 25178, at least in the region of the adhesive section.

The invention is based on the realization that, for aluminum-based coatings, a particularly strong mechanical anchoring of the adhesive on the surface must be ensured in order to achieve an optimal adhesive bonding.

For this purpose, the invention provides that, at least in the adhesive section but preferably over the entire surface of the component according to the invention, there exists a surface texture by means of which the real surface of the adhesive section which is effectively available for the bonding of the adhesive to the component is increased as compared to a perfectly planar surface. This increase results from the fact that, according to the invention, peaks and troughs are formed in the surface at least in the adhesive section. As a result of the slopes which, for example, extend from the tip of the peak to the respective base of the trough, or delimit the troughs, the effective surface in the adhesive section on which the reaction between the adhesive and the coated steel plate of the component takes place upon adhesion is significantly greater than the area which the surface of the adhesive section would occupy if it were optimally flat. The "SDR value," determined according to ISO 25178, thereby corresponds to the percentage by which the real surface of the adhesive section is greater, due to its texturing formed by the peaks and troughs formed in the surface, than the surface which would be present in the adhesive section if this were absolutely flat. ISO 25178 also directs that roughness values be measured using a white light interferometer.

With regard to the durability of an adhesive connection produced on a sheet metal component according to the invention, it has now been found to be advantageous if the SDR value is 3% to 30%.

For an SDR value of less than 3%, the surface involved in the reaction would be too minimal in the region of the adhesive section, and there would not be sufficient mechanical interlocking between the relevant surface and the adhesive to ensure the required adhesive bond.

High SDR values above 30% are desirable if a sheet metal component is to be painted. The high SDR value ensures optimal adhesion of the paint to the substrate and achieves a varnish which also meets the particularly strict requirements that, for example, exist in automotive bodywork. However, practical investigations have yielded that, given adhesions, SDR values of more than 30% result in an unfavorable fracture behavior. Thus, a "surface of fracture SFC" of 5-25% results at SDR values above 30%. By contrast, given SDR values below 3%, a "surface of fracture SFC" of 28-51% results. Standardized "surface of fracture SFC" values of optimally 90-100% only appear in the range of SDR values from 3-30% specified according to the invention.

"SFC" refers here to the standardized "SURFACE COHESION FRACTURE". For SFC values of 90-100%, the adhesion between adhesive and finishing fails, i.e., between the adhesive and the Al corrosion protection layer, and not in the adhesive or in the finishing itself.

When the surface of fracture is destroyed, it is desirable that it occurs at this point. To determine the SFC value, samples are provided with adhesive, adhered to one another, cured according to the method applicable to the respective adhesive, and then separated from one another by a tensile testing machine. The surfaces of fracture are subsequently evaluated optically. The total surface of fracture is considered to be 100%.

A surface increased according to the invention is obtained in that peaks and troughs are formed in the surface of the flat steel product, which is deformed by hot forming to produce the sheet metal component. According to the findings of the invention, here SRD values above 30% mean that the ratio of trough depth to trough width can be so unfavorable that, due to its viscosity, the adhesive can no longer completely fill the troughs between the rises (=peaks) and thus can no longer completely utilize the surfaces available in the adhesive section for interlocking.

There can thereby be an especially problematic effect that, in the hot forming process, the surface finish cannot be completed in the course of applying the corrosion coating or by subsequent skin-pass rolling, as given cold-formed strips. This is due to the fact that the coating is molten during the heating of the sheet metal material that is necessary for the hot forming process. This leads to the roughness of the uncoated cold strip having a greater influence on the surface roughness of the hot-formed component than the surface topography present on its surface after the strip has been coated with the aluminum coating.

In the absence of a uniform standard for testing adhesive bonds, the properties of the adhesions performed on the inventive and non-inventive sheet metal components and reported and defined here were determined according to Stahl-Eisen-Prüfblatt SEP_1220_6 (draft).

The invention has also limited the SDR value present at the surface of a sheet metal component according to the invention, and provided with an Al coating, with regard to optimum hot forming capability of the sheet metal material from which the sheet metal component is formed. Excessive SDR values could result in high averaged surface roughnesses Rz. The averaged surface roughness Rz is likewise determined according to DIN EN ISO 4287/1 and corresponds to the mean value of individual surface roughnesses of five successive individual measurement lengths in the roughness profile. In each measurement segment, the extreme values are added to form a range and divided by the number of measurement segments. Excessive Rz values have a disadvantageous effect in the hot forming tool, since there the peaks present on the surface of the sheet metal material result in scoring, or can lead to an increased degree of soiling due to peaks breaking off and the formation of dust associated therewith. Preferably, the mean surface roughness Rz is limited to at most 2 µm in order to avoid an excessive dust formation during hot forming.

This risk can also be effectively counteracted in that the peak count RPc of the surface of the Al-coated flat steel product to be formed into the respective sheet metal component according to the invention is not greater than 200 per cm. The standardized peak count RPc is determined according to DIN EN 10049/DIN EN ISO 4287, and corresponds to the number of local peaks which successively exceed an upper intersection c1 and a lower intersection c2. The peak count RPc is based, independently of the selected measurement length, on a length of 1 cm.

The real surface can be determined only with special measurement methods and only in comparison to an ideally smooth surface. A simple value to be determined is the aforementioned peak count RPc. For aluminum and aluminum alloys, after hot forming said value is in direct relationship with the real surface, which is described by the characteristic value SDR.

The size $F_{real}$ of the real surface of the adhesive section can then be estimated as follows:

$$F_{real} = e^{0.2\ RPc}$$

In contrast, the size $F_{flat}$ of the optimally flat surface of the adhesive section can be determined in purely mathematical terms from its geometric limits. The SDR value then results as $$SDR = (F_{real} - F_{flat})/F_{flat} \times 100\%$$

The steel substrate of a sheet metal component according to the invention consists of a conventional steel suitable for these purposes, the composition of which is selected as follows:

In the steel of a flat steel product from which a component according to the invention is formed, carbon ("C") acts to delay the formation of ferrite and bainite. At the same time, the residual austenite is stabilized due to the presence of C, and the Ac3 temperature is reduced. The C content of the steel of a flat steel product according to the invention is limited to values of from 0.10 mass. % to 0.4 mass. %. A C content of at least 0.10 mass. % is necessary in order to ensure the hardenability of the flat steel product, and the tensile strength of at least 1000 MPa of the press-hardened product formed therefrom according to the invention. If a higher strength level is to be achieved, C contents >0.15 mass. % can be adjusted for this purpose. If the C content is raised to values >0.19 mass. %, hardenability can furthermore be improved. A component consisting of a flat steel product containing more than 0.19 mass. % and alloyed according to the invention has a very good combination of hardenability and strength. C contents of more than 0.4 mass. %, however, have a disadvantageous effect on the mechanical properties of the flat steel product, since C contents greater than 0.4 mass. % promote the formation of brittle martensite during press hardening. Moreover, weldability is negatively influenced by high C contents. If an optimized weldability is to be ensured, the C content can be adjusted for this purpose to values of at most 0.3 mass. %, in particular less than 0.3 mass. %. By reducing the C contents to <0.25 mass. %, weldability can again be markedly improved, and a good ratio of force absorption and maximum bending angle in the bending test according to VDA 238-100 in the press-hardened state can additionally be achieved.

Silicon ("Si") is used to further increase the hardenability of a flat steel product, which is formed into a component according to the invention and is alloyed according to the invention, and the strength of the press-hardened product formed therefrom, via solid solution strengthening. Silicon moreover enables the use of ferrosilicon manganese as an alloying agent, which has an advantageous effect on production costs. A hardening effect already appears as of an Si content of 0.05 mass. %. As of an Si content of >0.15 mass. %, a significant increase in strength occurs. However, Si contents above 0.5 mass. % have a disadvantageous effect on coating behavior, especially for aluminum-based coatings. Si contents of less than 0.4 mass. % are therefore preferably set in order to improve the surface quality of the coated flat steel product.

In the alloy of the steel of a flat steel product from which a component according to the invention is formed, manganese ("Mn") acts as a hardening element by greatly delaying the formation of ferrite and bainite. For manganese contents of less than 0.5 mass. %, even at very rapid cooling rates, ferrite and bainite are formed during press hardening, which should be avoided. Mn contents greater than 0.9 mass. % are therefore preferred if a martensitic structure is to be ensured, in particular in regions of greater deformation. However, Mn contents greater than 3.0 mass. % have a disadvantageous effect on the processing properties. In particular, weldability is greatly limited, which is why the Mn content of flat steel products according to the invention is limited to at most 3.0 mass. %, in particular to at most 1.6 mass. %.

Chromium ("Cr") is present in contents of 0.005-1.0 mass. % in the steel of a flat steel product from which a component according to the invention is formed. Cr influences the hardenability of the flat steel product in that it slows the diffusive conversion during press hardening. As of a content of 0.005 mass. %, Cr has a favorable effect on hardenability in flat steel products according to the invention, wherein a Cr content >0.1 mass. % is preferred for safe process control, especially for preventing bainite formation. If the steel contains more than 1.0 mass. % chromium, however, the coating behavior deteriorates. In order to obtain an optimized surface quality, the Cr content can be limited to at most 0.4 mass. %.

Boron ("B") can optionally be added to the alloy of the steel of the flat steel product from which a component according to the invention is formed, in order to improve the hardenability of the flat steel product. Boron atoms or boron deposits deposited on the austenite grain boundaries reduce the grain boundary energy, as a result of which the nucleation of ferrite during press hardening is suppressed. A distinct effect on hardenability occurs as of B contents of at least 0.0005 mass. %. By contrast, for B contents above 0.01 mass. %, boron carbides, boron nitrides, or boron nitrocarbides are increasingly formed, which in turn represent preferred nucleation sites for the nucleation of ferrite and would reduce the hardening effect. For this reason, according to the invention the B content is limited to at most 0.01 mass. %.

In order to adjust certain properties of the steel or of the flat steel product produced therefrom, a respective element-two or more alloy elements of the alloy elements included in the group V, Ti, Nb, Al, Ni, Cu, Mo, W-can optionally be added to the steel, wherein the contents of the respective optionally present alloy element(s) are to be measured as follows:

Even the smallest amounts of vanadium ("V") of at least 0.001 mass. % can impede free carbon, present in the steel of a flat steel product processed according to the invention, from accumulating at dislocations. The aging resistance of the steel is hereby improved. No increase in this effect occurs as of a V content of 0.2 mass. %. The aging-inhibiting effect of vanadium is particularly pronounced given V contents of up to 0.009 mass. %, wherein a maximum effect appears as of a V content of 0.002 mass. %.

Titanium ("Ti") can be added to the steel of a flat steel product formed according to the invention to form a component, if necessary in contents of 0.001-0.1 mass. %, in order to fix nitrogen present in the steel. In order to achieve this reliably, a Ti content % Ti can be provided which is at least 3.42 times the nitrogen content % N (% Ti=3.42×% N).

Aluminum ("Al") can optionally be present in contents of 0.01-0.2 mass. % in the steel of a flat steel product formed according to the invention to form a component. Aluminum contents of at most 0.1 mass. % thereby prove to be particularly effective. Aluminum is used as the deoxidizing agent for fixing oxygen. In addition, aluminum inhibits cementite formation. For reliable fixing of oxygen, at least 0.01 mass. % Al is required in the steel. However, since the Ac3 temperature is also pushed upward significantly as the Al alloy content increases, the Al content is limited to 0.2 mass. %. For contents of more than 0.2 mass. %, aluminum would so severely hinder the conversion to austenite before hot forming that austenitization could no longer be performed efficiently in terms of time and energy.

If required, niobium ("Nb") can be added in contents of 0.001-0.1 mass. % to the steel of a flat steel product formed according to the invention to form a component, in order to bind free carbon via the formation of iron carbides, which has a favorable effect on the aging behavior.

Nickel ("Ni") stabilizes the austenitic phase of the steel of a flat steel product formed according to the invention to form a component, and can therefore optionally be added to the alloy to reduce the Ac3 temperature and to suppress the formation of ferrite and bainite. Nickel moreover has a positive influence on the hot rolling capability. Contents of more than 0.4 mass. %, however, no longer contribute to the positive influences of the presence of Ni. The Ni content is therefore preferably limited to less than 0.4 mass. %.

The hardenability can be increased via the optional addition of at least 0.1 mass. % Cu. Moreover, copper improves the resistance to atmospheric corrosion of uncoated metal sheets or cut edges. However, the hot rolling capability can be worsened by the presence of copper.

This effect can be counteracted by the addition of at least 0.01 mass. % Ni. Due to low-melting Cu phases on the surface, as of a content of 0.8 mass. % Cu the hot rolling capability deteriorates so significantly that contents of more than 0.8 mass. % should be avoided.

To improve process stability, molybdenum ("Mo") can optionally be added to the steel of a flat steel product formed according to the invention to form a component. Mo significantly slows the ferrite formation. As of contents of 0.002 mass. % Mo, molybdenum-carbon clusters dynamically form ultrafine molybdenum carbides at the grain boundaries, and significantly slow the mobility of the grain boundary and thus diffusive phase transformations. In addition, the grain boundary energy is reduced by Mo, which reduces the nucleation rate of ferrite. An effective use of the positive influences of Mo is thereby ensured in that the Mo content is limited to at most 1.0 mass. %.

Tungsten ("W") can optionally be added to the alloy in contents of 0.001-1.0 mass. % to slow the ferrite formation. A positive effect on hardenability already results at W contents of at least 0.001 mass. %. For cost reasons, a maximum of 1.0 mass. % tungsten is added to the alloy. The remainder of the steel, of which the steel substrate of a hot-formed flat steel product according to the invention and the sheet metal component obtained therefrom by the hot forming consist, is iron and unavoidable impurities, wherein contents of less than 0.1 mass. % P, less than 0.05% S, and less than 0.01% N are included among the unavoidable impurities. The contents of the impurities are thereby in each case so small that they do not have any effect on the properties of the steel and the metal sheet produced therefrom.

For this purpose, the sum of the contents of the impurities is preferably limited to less than 2 mass. %.

The corrosion protection coating, which is present on a hot-formed flat steel product according to the invention and thus concomitantly on the sheet metal component according to the invention, can consist of pure aluminum or an aluminum alloy. Accordingly, the corrosion protection coating can consist of aluminum, wherein, in addition to the technically unavoidable impurities, 3-15% Si, 2-3.5% Fe (in mass. %) and/or at least one alkaline earth metal or transition metal may respectively optionally be contained in the Al alloy layer provided as corrosion protection, wherein the content of the alkaline earth metal or transition metals is in total 0.1-0.5%. The content of the impurities is thereby typically limited to at most 1%.

The Si content of the corrosion protection layer contributes to the sufficient but not maximum formation of the iron-aluminum alloy layer, and thus ensures sufficiently good adhesion with likewise provided cold forming. This effect can be achieved particularly reliably given contents of at least 7 mass. % Si, in particular at least 9 mass. % Si. The effect of Si in the corrosion protection coating provided according to the invention can be utilized particularly effectively given contents of at most 12 mass. % Si, in particular at most 10 mass. % Si.

Iron ("Fe") can be present in contents of 2-3.5 mass. % in the corrosion protection coating, provided according to the invention, of a sheet metal component according to the invention. Fe present in these contents in the coating contributes to the formation of an alloy layer between the steel substrate and the coating, and in this way supports the adhesion of the coating.

The corrosion protection layer can contain at least one alkaline earth metal or transition metal in contents of 0.05-2 mass. %, in order to form a thin, covering oxide layer on the free upper side of the corrosion protection layer. The presence of at least one alkaline earth metal and/or at least one transition metal proves particularly advantageous if the sum of the contents of these metals in the coating of a sheet metal component according to the invention is 0.1-0.5 mass. %, in particular 0.15-0.4 mass. %. Of the alkaline earth metals and transition metals in question, magnesium and calcium have been found to be particularly productive, but strontium, barium, zirconium, and titanium can also be used.

In principle, any method with which it is possible to deposit sufficiently thin layers on the steel substrate can be used to apply a protective coating provided according to the invention onto the respective steel substrate. For this purpose, a conventional hot-dip galvanizing ("hot-dip aluminizing") is particularly suitable, which allows a corrosion protection to be particularly economically generated on a steel sheet.

In accordance with the preceding explanations, a method according to the invention for producing a sheet metal component according to the invention comprises the following work steps:

a) providing a hot-rolled flat steel product comprising a steel substrate, which, in mass. %, consists of C: 0.1-0.4%, Mn: 0.5-3.0%, Si: 0.05-0.5% Cr: 0.005-1.0%, B: 0.0005-0.01%, and in each case optionally one or more of the alloy elements included in the group V, Ti, Nb, Al, Ni, Cu, Mo, W, with the proviso that the contents of the respective optionally present alloy element are to be measured as follows: V: 0.001-0.2%, Ti: 0.001-0.1%, Nb: 0.001-0.1%, Al: 0.01-0.2%, Ni: 0.01-0.4%, Cu: 0.01-0.8% Mo: 0.002-1.0%, W: 0.001-1.0%, and the remainder of iron and unavoidable impurities, wherein the unavoidable impurities include contents of less than 0.1% P, less than 0.05% S, and less than 0.01% N, b) optional pickling of the hot strip, c) cold rolling the hot strip to form a cold strip, wherein the cold rolling is optionally performed in more than one rolling step, and wherein, likewise optionally, the respective cold-rolled strip obtained after the preceding cold rolling step is annealed between the cold rolling steps, d) coating the cold strip with a corrosion protection coating based on aluminum, e) skin-pass rolling the cold strip provided with the corrosion protection layer, f) sectioning off a blank from the skin-pass rolled cold strip, g) heating the blank to a hot forming temperature of 850-950° C., h) hot forming the heated blank to form the component.

Optionally, the component obtained in step h) can be hardened in addition to its hot forming. This hardening can take place in a manner known per se at the same time as the hot forming taking place in step h), or in a heat treatment process downstream of the hot forming process. If the hot forming and hardening are performed in one go, it is also referred to as "press hardening" or as a "single-stage" hot forming and hardening process. By contrast, a process in which the flat steel product is first hot formed and then hardened in a second step via a suitable heat treatment is referred to as a "two-stage process". Regardless of whether a combined, single-stage, or two-stage hot forming and hardening is performed, the measures required for this purpose and the process parameters to be adjusted are known to the person skilled in the art (see, for example, the already aforementioned WO 2008/053273 A1).

According to the invention, via the cold rolling (work step c)) and/or the skin-pass rolling (work step e)), the cold strip thereby has a surface texture which has a maximum wavelength that is in a range ranging from 0.1 mm to 1.0 mm, at least in a surface portion of the free outer face of the corrosion protection layer which forms an adhesive section in the finished hot-formed component, which adhesive section is provided for applying an adhesive for adhering the sheet metal component to a further component.

In the typical production of sheet metal components made of flat steel products provided with a corrosion protection coating, the work steps "producing the steel and a precursor product cast therefrom, such as slab, thin slab, or cast strip, in the steel mill," "hot rolling the preliminary product to form a hot-rolled strip ("hot strip")," "pickling the hot strip to remove scale and impurity residues adhering to the strip," "cold rolling the hot strip to form a cold-rolled strip ("cold strip")," "coating the cold strip with the Al-based corrosion protection coating," "skin-pass rolling and or finish treating of the surface of the cold strip provided with corrosion protection coating," "heating the cold strip provided with the corrosion protection coating to a hot forming temperature," and "hot forming the cold strip heated to the hot forming temperature to form the sheet metal component" are passed through in succession, wherein, of course, further work steps can be completed between the work steps explicitly mentioned here, which further work steps are performed in conventional production and processing in the art of cold-rolled strips to form sheet metal components in order to ensure a proper workflow and an optimized work result.

By way of example, the following can be used as an indication of the parameters which are adjusted for the individual work steps passed through in the production of a cold strip formed according to the invention to make sheet metal components:

a) providing a hot-rolled flat steel product:
   melting a steel melt in a conventional manner, which steel melt is composed according to the invention in accordance with the explanations given above, and casting the steel melt to form a slab in a likewise conventional manner;
   heating the slab in an oven to a slab drawing temperature Bzt of 1200-1270° C., as of which the slab is drawn out of the furnace;
   hot rolling the slab into a 3-5 mm thick hot-rolled strip ("hot strip"), wherein the hot rolling comprises rough rolling with a thickness reduction of 80-90% and a final rolling with a thickness reduction of 85-95%, wherein the overall degree of forming achieved via hot rolling is 95-99.5%, wherein a thickness reduction ΔdF of 1-25% is achieved in the last rolling pass, and wherein the hot rolling end temperature is 850-950° C.;
   cooling the obtained hot strip to a coiling temperature of 620-780° C., wherein the cooling rate is 4-30 K/s;
   coiling the hot-rolled flat steel product to form a coil;
b) pickling the hot strip to remove the scale;
c) single- or multi-stage cold rolling of the hot strip to form a cold-rolled strip ("cold strip"), wherein the total true strain achieved via the cold rolling is 70-90%.

In the usual production of cold-rolled, hot-dip coated steel strips, a surface finish is thus performed after the coating, in which the surface structure is optimized for the subsequent work steps. However, it is found that such a surface finish has no influence on the surface topography that is present for sheet metal components produced by hot forming of cold strip or blanks obtained therefrom.

Rather, the roughness of the cold strip is significant to the surface topography of a hot-formed product produced according to the invention, at least in the region of the adhesive section of the sheet metal component. This applies in particular when the corrosion protection coating is applied by hot-dip coating ("hot-dip aluminizing") onto the steel substrate of the cold strip. By applying the Al melt, the strip is first smoothed in that the melt is placed over the peaks and troughs of the surface structure and covers it. In the course of the reheating necessary for hot forming, in which the cold-rolled hot-dip coated flat steel product is heated to temperatures of more than 600° C., the coating softens again and thus reproduces the roughness of the cold strip.

In order to produce, by cold rolling, the surface texture provided according to the invention in the section of the surface of the corrosion protection layer forming the adhesive section in the later component, the respective cold strip can be cold rolled in the last rolling step of the cold rolling with a cold rolling deformation of 10-75%, at a belt speed at the intake of the roll stand of 10-600 m/min, at a belt speed at the output of the roll stand of 20-1000 m/min, with a rolling force of 150-1300 KN and a tensile force of 5-110 kN. The rolling roughness Ra is 1.0-5.0 μm at a peak count RPc of 15-50 l/μm.

Likewise, to contribute to the shaping of the surface condition provided according to the invention and characterized by an SDR value of 3-30% in the region of the adhesive section of the sheet metal component according to the invention, it is possible that the blank be kept at the hot forming temperature over a duration of 2-15 min in work step g) in order to subsequently be reformed into the sheet metal component.

The invention is explained in more detail below with reference to exemplary embodiments.

In a first test, a steel strip serving as a steel substrate and having the composition indicated in Table 1 was coated by conventional hot-dip coating with a corrosion protection coating consisting of 10 mass. % Si, 3.5 mass. % Fe, up to 1 mass. % of unavoidable impurities, and the remainder of aluminum. The coating weight per side of the steel strip was adjusted to 70 g/m².

Blanks were punched from the steel strip and were then annealed at an annealing temperature of 925° C. for an annealing period of 5 minutes in order to subsequently be hot-formed to respectively form a sheet metal component. The SDR value in an adhesive section on the free surface of the obtained sheet metal components, which SDR value was defined according to ISO 25178, was 18%.

The components were adhered to one another by means of epoxy adhesive Betamate 1620 MB, which was applied in the region of the adhesive section and which is available from Dow Automotive (see data sheet "BETAMATE™ 1620 MB", published by Dow Europe GmbH, Edition 02, 29

Jun. 2010). When the surface of fracture is subsequently checked, a standard of 95% of the ideal surface of fracture SFC could be achieved.

In an additional test series, four steel melts A-D were produced whose compositions are indicated in Table 2. The composition of the steel melts A-D corresponded to the composition of conventional steels, which are provided for the production of flat steel products from which sheet metal components with high strength can be produced in a likewise known manner by hot forming and associated sufficiently rapid cooling, or by subsequent heat treatment which comprises cooling at a sufficient cooling rate.

Hot strips have been produced in a conventional manner from steels A-D, have passed through pickling treatment in a likewise conventional manner, and have subsequently been cold rolled in a plurality of stages to form a respective cold strip with a thickness of 1.5 mm.

Apart from the last stage, the cold rolling has also been performed in a conventional manner.

By contrast, in the last stage of cold rolling, the parameters "speed at the intake of the cold roll stand," "speed at the output of the cold roll stand," "rolling force," and "tension acting on the cold-rolled strip" have been adjusted on average as indicated in table 3 in order to obtain a defined surface roughness on the obtained cold strip.

For the cold strips K1-K6 obtained in this way, the SDR values of the surface were determined according to ISO 25178.

Subsequently, the cold strips K1-K6 were coated in a conventional manner with Al corrosion protection coatings Z1-Z3 having different compositions, said compositions being indicated in Table 4. The SDR values were also determined, in accordance with ISO 25178, at the surfaces of the cold strips K1-K6 coated with the respective corrosion protection layer Z1-Z3.

Blanks were sectioned off from the hot-dip coated cold strips K1-K6 and were heated in a continuous furnace for an annealing period tG to an annealing temperature TG and kept there. The association of the corrosion protection coatings Z1-Z3 with the cold strips K1-K6 produced from the steels A-D, the respectively achieved coating weight AG per side, the respective annealing duration tG, and the respective annealing temperature TG are recorded in Table 5.

The blanks heated to the annealing temperature TG were hot formed in a conventional manner in a hot press tool to form a respective sheet metal component. After cooling to room temperature, the SDR values at the preformed sheet metal components were determined at least in the adhesive section of the surface in which an adhesive bond was subsequently to be made.

The sheet metal components were then adhered to similar components by means of the adhesive Betamate 1620 MB according to production protocol, and the SFC value of the adhesive bond was determined in the manner already explained above.

The SDR values determined for the cold strips K1-K6 after the cold rolling ("SDR cold strip"), after the hot-dip coating ("SDR hot-dipping"), and at the sheet metal component ("SDR sheet metal component") hot formed from the respective cold strip K1-K6, and the "standardized surface of fracture SFC" determined for the adhesive bond, are indicated in Table 6.

The tests confirm that, from a technical perspective, the SDR values present in the cold strips are equivalently present in the finished sheet metal component, and that the SDR values produced according to the invention at the sheet metal component result in surfaces of fracture SFC which represent an optimal adhesive suitability.

TABLE 1

| Specifications in mass. %, remainder Fe and unavoidable impurities | | | | | | | | |
|---|---|---|---|---|---|---|---|---|
| C | Si | Mn | P | S | Al | Cr + Mo | Ti | B |
| 0.22 | 0.35 | 1.35 | 0.022 | 0.008 | 0.010 | 0.4 | 0.03 | 0.004 |

TABLE 2

| | Specifications in mass. %, remainder Fe and unavoidable impurities | | | | | | | | |
|---|---|---|---|---|---|---|---|---|---|
| Steel | C | Si | Mn | P | S | Al | Nb | Ti | B |
| A | 0.08 | 0.33 | 0.95 | 0.025 | 0.020 | 0.013 | 0.09 | 0.010 | 0.005 |
| B | 0.23 | 0.38 | 1.3 | 0.020 | 0.007 | 0.013 | — | 0.03 | 0.004 |
| C | 0.38 | 0.37 | 1.38 | 0.020 | 0.008 | 0.013 | — | 0.10 | 0.005 |
| D | 0.20 | 0.35 | 1.35 | 0.020 | 0.008 | 0.012 | — | 0.02 | 0.004 |

TABLE 3

| Steel | Intake rate | Output rate | Rolling force | Draw |
|---|---|---|---|---|
| A | 280 m/min | 620 m/min | 795 kN | 60 kN |
| B | 133 m/min | 300 m/min | 844 kN | 67 kN |
| C | 304 m/min | 670 m/min | 755 kN | 65 kN |
| D | 219 m/min | 390 m/min | 918 kN | 68 kN |

TABLE 4

| | Specifications in mass. %, remainder Al and unavoidable impurities | | |
|---|---|---|---|
| Al coating | Mg | Si | Fe |
| Z1 | 0.3 | 9.5 | 3 |
| Z2 | — | 9.5 | 3.5 |
| Z3 | — | 10 | 3 |

TABLE 5

| Cold strip | Steel | Coating | AG [g/m$^2$]* | tG [min] | TG [° C.] |
|---|---|---|---|---|---|
| K1 | A | Z2 | 69 | 5 | 925 |
| K2 | B | Z1 | 70 | 5 | 925 |
| K3 | C | Z2 | 75 | 5 | 920 |
| K4 | D | Z3 | 65 | 6 | 925 |
| K5 | B | Z1 | 70 | 6 | 900 |
| K6 | D | Z3 | 71 | 6 | 920 |

TABLE 6

| Cold strip | SDR cold strip | SDR hot dip | SDR sheet metal component | Standardized surface of fracture SFC |
|---|---|---|---|---|
| K1 | 27 | 19 | 26 | 105% |
| K2 | 25 | 15 | 23 | 95% |
| K3 | 24 | 15 | 23 | 94% |
| K4 | 18 | 11 | 17 | 92% |
| K5 | 28 | 20 | 26 | 99% |
| K6 | 21 | 12 | 20 | 92% |

The invention claimed is:
1. A sheet metal component,
which is made of a hot-formed flat steel product comprising a steel substrate which, in mass. %, consists of:
C: 0.1-0.4%,
Mn: 0.5-3.0%,
Si: 0.05-0.5%,
Cr: 0.005-1.0%,
B: 0.0005-0.01%,
and optionally one or more of alloy elements selected from the group consisting of V, Ti, Nb, Al, Ni, Cu, Mo, and W, with the proviso that the contents of the respective optionally present alloy element are to be measured as follows:
V: 0.001-0.2%,
Ti: 0.001-0.1%,
Nb: 0.001-0.1%,
Al: 0.01-0.2%,
Ni: 0.01-0.4%,
Cu: 0.01-0.8%,
Mo: 0.002-1.0%,
W: 0.001-1.0%,
and the remainder of iron and unavoidable impurities, wherein the unavoidable impurities include contents of less than 0.1% P, less than 0.05% S, and less than 0.01% N,
and
a corrosion protection layer based on aluminum applied to the steel substrate,
wherein the component is optionally hardened,
wherein an adhesive section is provided on an outer surface of the corrosion protection coating, which adhesive section is intended for applying an adhesive for adhering the sheet metal component to another component; and
wherein the outer surface of the corrosion protection coating has an SDR value of 3-30%, determined according to ISO 25178, at least in a region of the adhesive section.

2. The sheet metal component according to claim 1, wherein the standardized peak count RPc is not more than 200 per cm in the adhesive section.

3. The sheet metal component according to claim 1, wherein the average surface roughness Rz in the adhesive section is not more than 2 µm.

4. The sheet metal component according to claim 1, wherein the corrosion protection coating contains, in mass. %, 3-15% Si, 2-3.5% Fe, and/or at least one alkaline earth metal or transition metal, wherein the contents of the alkaline earth metal or transition metals are in total 0.1-0.5%.

5. The sheet metal component according to claim 4, wherein the corrosion protection coating contains an alkaline earth metal or transition metal selected from the group consisting of Mg, Ca, Sr, Ba, Zr, Ti.

6. A method for producing a sheet metal component, comprising the following work steps:
a) providing a hot-rolled flat steel product comprising a steel substrate, which, in mass. %, consists of C: 0.1-0.4%, Mn: 0.5-3.0%, Si: 0.05-0.5%, Cr: 0.005-1.0%, B: 0.0005-0.01%, and optionally one or more of alloy elements selected from the group consisting of V, Ti, Nb, Al, Ni, Cu, Mo, and W, with the proviso that the contents of the respective optionally present alloy element are to be measured as follows: V: 0.001-0.2%, Ti: 0.001-0.1%, Nb: 0.001-0.1%, Al: 0.01-0.2%, Ni: 0.01-0.4%, Cu: 0.01-0.8% Mo: 0.002-1.0%, W: 0.001-1.0%, and the remainder of iron and unavoidable impurities, wherein the unavoidable impurities include contents of less than 0.1% P, less than 0.05% S, and less than 0.01% N,
b) optional pickling of the hot rolled flat steel product,
c) cold rolling the hot rolled flat steel product to form a cold strip, wherein the cold rolling is optionally performed in more than one rolling step, and wherein, optionally, the respective cold-rolled strip obtained after the previous cold rolling step is optionally annealed between the cold rolling steps,
d) coating the cold strip with a corrosion protection coating based on aluminum,
e) skin-pass rolling the cold strip provided with the corrosion protection layer,
f) sectioning off a blank from the skin-pass rolled cold strip,
g) heating the blank to a hot forming temperature of 850-950° C., and
h) hot forming the heated blank to form the sheet metal component,
wherein the corrosion protection layer at least in a surface portion which forms an adhesive section of the sheet metal component, has a surface texture which has a maximum wavelength from 0.1 mm to 1.0 mm, and
wherein the adhesive section is provided for applying an adhesive for adhering the sheet metal component to a further component.

7. The method according to claim 6, wherein the cold strip is cold rolled in a last rolling step of the cold rolling with a cold deformation of 10-75%, at a belt speed of 10-600 m/min at the intake of the roll stand, at a belt speed of 20-1000 m/min at the output of the roll stand, with a rolling force of 150-1300 KN and a tensile force of 5-110 kN.

8. The method according to claim 6, wherein, in work step c), a roll roughness is Ra 1.0-5.0 µm at a peak count RPc of 15-50 l/µm.

9. The method according to claim 6, wherein, in step g), the blank is kept at the hot forming temperature for a period of 2-15 min.

10. The method according to claim 9, wherein, in step g), the blank is kept at the hot forming temperature for a period of 3-10 min.

11. The method according to claim 6, wherein the component is hardened after or during work step h).

12. The method according to claim 11, wherein the hardening is carried out as a press hardening accompanied by hot forming.

* * * * *

UNITED STATES PATENT AND TRADEMARK OFFICE
CERTIFICATE OF CORRECTION

| | | |
|---|---|---|
| PATENT NO. | : 12,104,218 B2 | Page 1 of 1 |
| APPLICATION NO. | : 18/027201 | |
| DATED | : October 1, 2024 | |
| INVENTOR(S) | : Jennifer Schulz et al. | |

It is certified that error appears in the above-identified patent and that said Letters Patent is hereby corrected as shown below:

On the Title Page

Item (57), Column 2, Abstract, Line 10, delete "include contents of" and insert -- include --

In the Claims

Column 14, Line 7, Claim 6, after "-0.8%" insert -- , --

Column 14, Line 43, Claim 7, delete "KN" and insert -- kN --

Signed and Sealed this
Tenth Day of December, 2024

*Katherine Kelly Vidal*

Katherine Kelly Vidal
*Director of the United States Patent and Trademark Office*